United States Patent
Wickramasuriya et al.

(10) Patent No.: US 10,413,825 B2
(45) Date of Patent: Sep. 17, 2019

(54) SOFTWARE-APPLICATION INITIATION

(71) Applicant: Google Technology Holdings LLC, Mountain View, CA (US)

(72) Inventors: Jehan Wickramasuriya, St. Charles, IL (US); Venugopal Vasudevan, Palatine, IL (US); Joseph F. Wodka, Hoffman Estates, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 28 days.

(21) Appl. No.: 15/465,769

(22) Filed: Mar. 22, 2017

(65) Prior Publication Data

US 2017/0189808 A1 Jul. 6, 2017

Related U.S. Application Data

(63) Continuation of application No. 13/584,969, filed on Aug. 14, 2012, now Pat. No. 9,630,095.

(51) Int. Cl.

| | |
|---|---|
| G09G 5/00 | (2006.01) |
| A63F 13/48 | (2014.01) |
| A63F 13/30 | (2014.01) |
| H04N 21/41 | (2011.01) |
| H04N 21/439 | (2011.01) |
| H04N 21/44 | (2011.01) |
| H04N 21/478 | (2011.01) |

(Continued)

(52) U.S. Cl.
CPC .............. *A63F 13/48* (2014.09); *A63F 13/12* (2013.01); *A63F 13/32* (2014.09); *A63F 13/332* (2014.09); *A63F 13/44* (2014.09); *H04N 19/597* (2014.11); *H04N 21/4113* (2013.01); *H04N 21/4126* (2013.01); *H04N 21/4394* (2013.01); *H04N 21/44008* (2013.01); *H04N 21/478* (2013.01); *H04N 21/4781* (2013.01); *H04N 21/8173* (2013.01); *H04N 21/8186* (2013.01); *A63F 2300/209* (2013.01); *A63F 2300/534* (2013.01)

(58) Field of Classification Search
CPC ....... H04W 4/02; G06F 15/16; H04L 63/0421
See application file for complete search history.

(56) References Cited

U.S. PATENT DOCUMENTS

| | | |
|---|---|---|
| 6,934,697 B1 | 8/2005 | Warren |
| 6,966,837 B1 | 11/2005 | Best |

(Continued)

*Primary Examiner* — David L Lewis
*Assistant Examiner* — Eric M Thomas
(74) *Attorney, Agent, or Firm* — Fish & Richardson P.C.

(57) ABSTRACT

Disclosed are methods and apparatus for triggering (i.e., initiating, launching, or running) a software application (e.g., an interactive game application) or other computer program or application on a user device (e.g., a computer, etc.) based on multimedia content being provided to (e.g., displayed on) a different user device (e.g., a different computer, a television, etc.). The methods may comprise displaying, using a first device, multimedia content. A multimedia-analysis process may then be performed to determine an attribute of the multimedia content being displayed. These attributes may be used to acquire (e.g., select or produce) a software application comprising one or more elements that relate to the multimedia content. The software application may then be launched (i.e., triggered, initiated, or run) on a second device, the second device being different from the first device.

20 Claims, 2 Drawing Sheets

(51) Int. Cl.
     *H04N 21/81*       (2011.01)
     *H04N 19/597*    (2014.01)
     *A63F 13/32*       (2014.01)
     *A63F 13/332*     (2014.01)
     *A63F 13/44*       (2014.01)

(56) References Cited

U.S. PATENT DOCUMENTS

| | | |
|---|---|---|
| 2002/0056112 A1* | 5/2002 | Dureau ................. H04H 20/08 |
| | | 725/78 |
| 2004/0015608 A1 | 1/2004 | Ellis et al. |
| 2004/0150667 A1* | 8/2004 | Dove ........................ G06F 8/34 |
| | | 715/763 |
| 2005/0066219 A1* | 3/2005 | Hoffman ............. G06F 21/6218 |
| | | 714/4.1 |
| 2006/0105841 A1 | 5/2006 | Rom et al. |
| 2007/0218979 A1 | 9/2007 | Momoda et al. |
| 2008/0288350 A1 | 11/2008 | Iris et al. |

\* cited by examiner

SOFTWARE-APPLICATION INITIATION

CROSS-REFERENCE TO RELATED APPLICATION

This application is a continuation of U.S. application Ser. No. 13/584,969, filed Aug. 14, 2012, the contents of which are hereby incorporated by reference.

TECHNICAL FIELD

The present disclosure is related to initiating software applications.

BACKGROUND

In the field of computer or video game development and marketing, providing, to consumers computer or video games that relate to multimedia content (e.g., television programs) that those consumers are consuming, or have recently consumed, tends to be difficult.

In particular, synchronizing computer or video games with TV programs that are being broadcast or have recently been broadcast tends to be difficult. Also, the assembling of a community of game players for multiplayer gameplay of such games tends to be difficult.

Furthermore, authoring costs associated with developing a game, and costs associated with the marketing of games to a large community of game players, tend to be high. In addition to, and separate from, development and marketing costs, for computer or video games that relate to multimedia content, costs associated with synchronizing those games to the related multimedia content and assembling a community of game players for multiplayer gameplay tend to be high.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
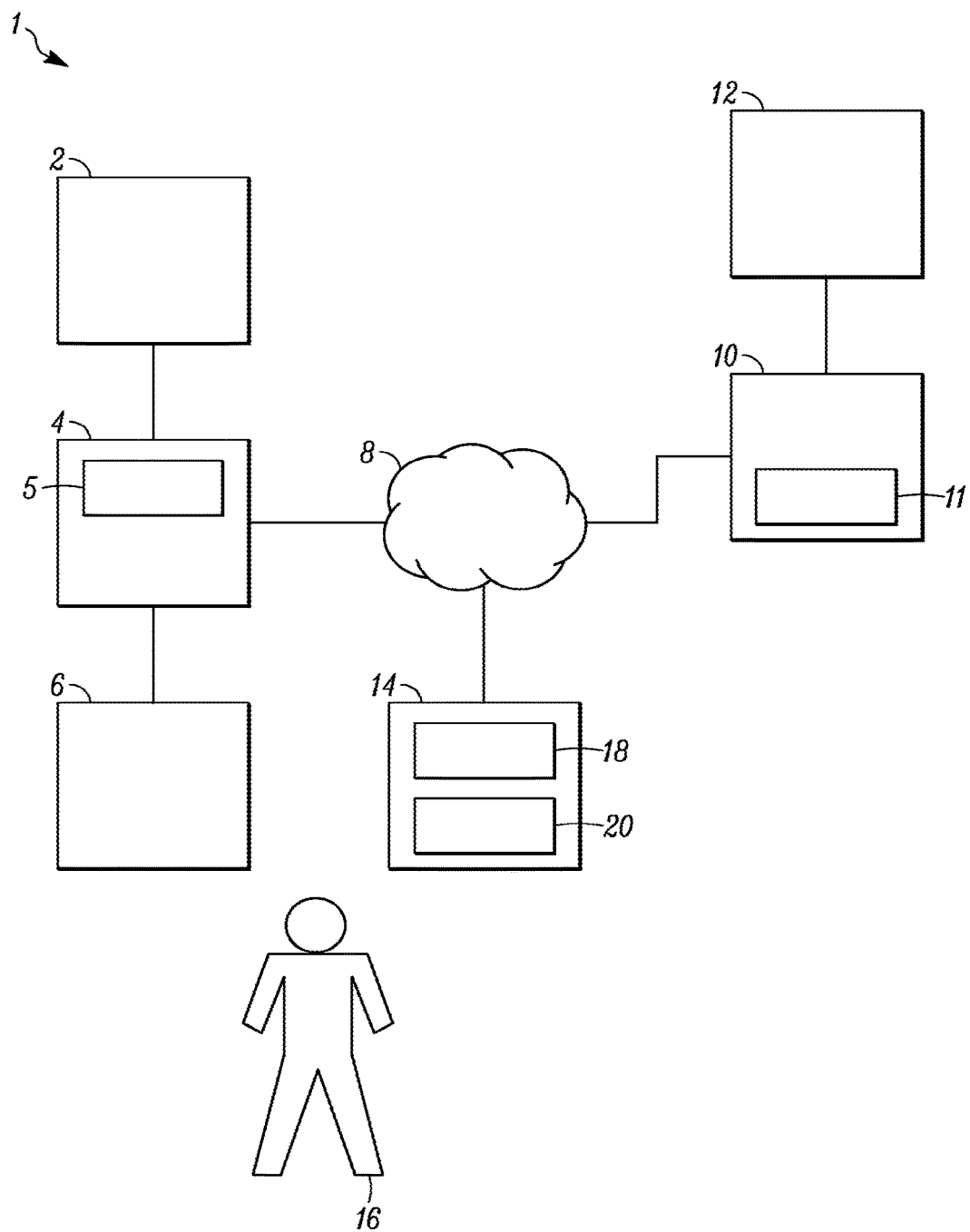
FIG. 1 is a schematic illustration (not to scale) showing an example network in which an embodiment of a method of initiating an application on a user device is implemented.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Embodiments of the present methods, systems, and apparatus trigger (i.e., initiate, launch, or run) a game, or other computer program or application, on a user device (e.g., a computer, etc.) based on multimedia content being provided to (e.g., displayed on) a different user device (e.g., a different computer, a television etc.).

Apparatus for implementing any of the below described arrangements, and for performing any of the below described method steps, may be provided by configuring or adapting any suitable apparatus, for example one or more computers or other processing apparatus or processors, or by providing additional modules. The apparatus may comprise a computer, a network of computers, or one or more processors, for implementing instructions and using data, including instructions and data in the form of a computer program or plurality of computer programs stored in or on a machine-readable storage medium such as computer memory, a computer disk, ROM, PROM, etc., or any combination of these or other storage media.

It should be noted that certain of the process steps depicted in the below described process flowcharts may be omitted or such process steps may be performed in an order differing from that presented below and shown in those process flowcharts. Furthermore, although all the process steps have, for convenience and ease of understanding, been depicted as discrete temporally-sequential steps, nevertheless some of the process steps may in fact be performed simultaneously or at least overlapping to some extent temporally.

Referring now to the Figures, FIG. 1 is a schematic illustration (not to scale) showing an example network 1 in which an embodiment of a method of initiating a software application (hereinafter referred to as an "application") on a user device is implemented. This method is described in more detail below with reference to FIG. 2. In this embodiment, the application to be initiated is a game. The terminology "initiate" is used herein to refer to the starting, launching, triggering, etc., of that program on a user device.

[This example network 1 comprises a content provider 2, a set-top box 4, a television (TV) 6, the Internet 8, a game-services module 10, one or more game providers 12, a tablet computer 14, and a user 16.

The content provider 2 provides multimedia content (e.g., TV programs, movies, radio, etc.) to the set-top box 4 such that the provided multimedia content may be displayed on the TV 6 for consumption by the user 16. The content provider 2 may also provide services related to that multimedia content to the set-top box 4 for use by the user 16. The connection between the content provider 2 and the set-top box 4 may be any appropriate connection, e.g., via a cable-TV network or satellite-TV network.

The set-top box 4 may receive multimedia content from the content provider 2 and display, on the TV 6, that multimedia content to the user 16. In this embodiment, the set-top box 4 comprises a media-analysis module 5 that is configured to perform one or more media-analysis processes on the content received by the set-top box 4 from the content provider 2. These media-analysis processes may be performed to analyze the multimedia content that is displayed to the user 16. The multimedia-analysis processes performed by the media-analysis module 5 and the purpose of such processes is described in more detail below with reference to FIG. 2. In other embodiments, the functionality provided by the media-analysis module 5 may be provided by a different module that may be, at least in part, remote from the set-top box 4. For example, multimedia-analysis processes may be performed by a media-analysis module that is located in the TV 6, or is an out-of-band module, etc.

In addition to being connected to the content provider 2 and the TV 6, the set-top box 4 may be connected (via the Internet 8 or in some other way) to the game-services module 10 such that information may be sent from the set-top box 4 to the game-services module 10 (e.g., an output of the media-analysis processes performed by the set-top box 4 may be sent from the set-top box 4 to the game-services module 10) and vice versa.

The TV 6 is a conventional television which, in operation, may display the multimedia content (e.g., TV programs) provided by the content provider 2 (and received by the TV 6 from the set-top box 4).

In other embodiments, multimedia content provided by the content provider 2 may be consumed by the user 16 (e.g., displayed to the user 16) using a different type of end-user device (i.e., instead of or in addition to the set-top box 4 communicatively coupled to the TV 6). For example, in other embodiments the user 16 may view TV programs provided by the content provider 2 using a desktop personal computer, a laptop computer, a tablet computer 14, a mobile station, an entertainment appliance, a wireless phone, a smartphone, a netbook, a game console, etc.

The functionality provided by the game-services module 10 is described in more detail below with reference to FIG. 2. The game-services module 10 may be connected, e.g., via the Internet 8, to the set-top box 4 such that information sent from the set-top box 4 may be received by the game-services module 10 and vice versa. Also, the game-services module 10 may be connected, e.g., via the Internet 8, to the tablet computer 14 such that information may be sent between the game-services module 10 and the tablet computer 14. The game-services module 10 may be configured to process information received by it from the set-top box 4 and from the tablet computer 14 as described in more detail below with reference to FIG. 2. Also, the game-services module 10 is connected to the one or more game providers 12 such that information (e.g., digital games provided by the game providers 12) may be sent from the game providers 12 to the game-services module 10 and vice versa. The game-services module 10 may comprise a database 11 in which information may be stored.

The game providers 12 are providers of digital games that may be played by consumers (e.g., the user 16). Some or all of the games provided by game providers may be suitable for playing on the tablet computer 14 or using the set-top box 4 and TV 6. Some or all of the games provided by game providers 12 may be suitable for playing on any or all of the following devices: a desktop personal computer, a laptop computer, a tablet computer 14, a mobile station, an entertainment appliance, a set-top box 4 communicatively coupled to a television 6, a wireless phone, a smartphone, a netbook, and a game console.

The game providers 12 may be connected to the game-services module 10 such that the game-services module 10 may receive or retrieve a game from the game providers 12. The received game may then be distributed by the game-services module 10 (e.g., via the Internet 8) to the tablet computer 14. The user 16 may play the game that is received by the tablet computer 14 by using the tablet computer 14.

A game may be any appropriate type of game. For example, a game may be a puzzle game, a word-based game, a skill game, a multi-player game, a single-player game, etc. A game provided by a game provider 12 may relate to specific multimedia content (e.g., a specific TV program or movie). Alternatively a game provided by a game provider 12 may be a "generic game" that does not relate to any specific multimedia content.

A game provided by a game provider 12 may comprise one or more elements or portions that may be dynamically filled using information or multimedia content. For example, a generic game (i.e., a game that does not relate to specific multimedia content) may have an element into which may be included or inserted media content or information relating to specific multimedia content. Thus, by including or inserting information or content relating to specific multimedia (e.g., a specific TV program or movie) into a generic game, a game that relates to that specific multimedia may be produced.

An example of such a generic game may be a puzzle game in which an image has been "cut up" into a plurality of image pieces. These pieces may be displayed to a player in an incorrect arrangement. The object of the game is for a player to re-arrange the image pieces to recreate the original image. For this game, an image relating to specific multimedia (e.g., a screenshot taken from a specific TV show) may be used as the image that is "cut up" into the image pieces. Thus, a puzzle game relating to that specific multimedia may be produced.

A further example of such a generic game is a word search game in which an array of letters and a predefined list of words is presented to the player. The object of the game is for the player to find, within the array of letters, the words in the list. For this game, words relating to the specific multimedia (e.g., closed caption or subtitle words that may have been extracted from the specific multimedia) may be used as the words in the list. Thus, a word search game relating to that specific multimedia may be produced.

The tablet computer 14 is a conventional tablet computer. The tablet computer 14 is coupled to the game-services module 10 via, e.g., the Internet 8 (e.g., via Wi-Fi Internet access). This coupling is such that information may be sent from the tablet computer 14 to the game-services module 10 and vice versa. In other embodiments, a different type of device may replace the tablet computer 14, e.g., a different type of computer (e.g., a laptop computer or a "smart-phone"). The tablet computer 14 may comprise a game container 18 and a touch-screen display 20.

The game container 18 may contain one or more games that may be played by the user 16 using the tablet computer 14. Alternatively or in addition, the game container 18 may contain references to one or more games that may be used (e.g., by the tablet computer 14 or by the game-services module 10) to retrieve the referenced games such that they may be played by the user 16 using the tablet computer 14. In other embodiments, the game container 18 may be external to the tablet computer 14. (For example, the game container 18 may be connected to the tablet computer 14 via the Internet 8.)

The user 16 may be a user or operator of the TV 6 and of the tablet computer 14. For example, the user 16 play a game (e.g., a game stored in the game container 18) using the tablet computer 14. Also, the user 16 may watch, using the TV 6, the multimedia content provided by the content provider 2.

Figure 2:
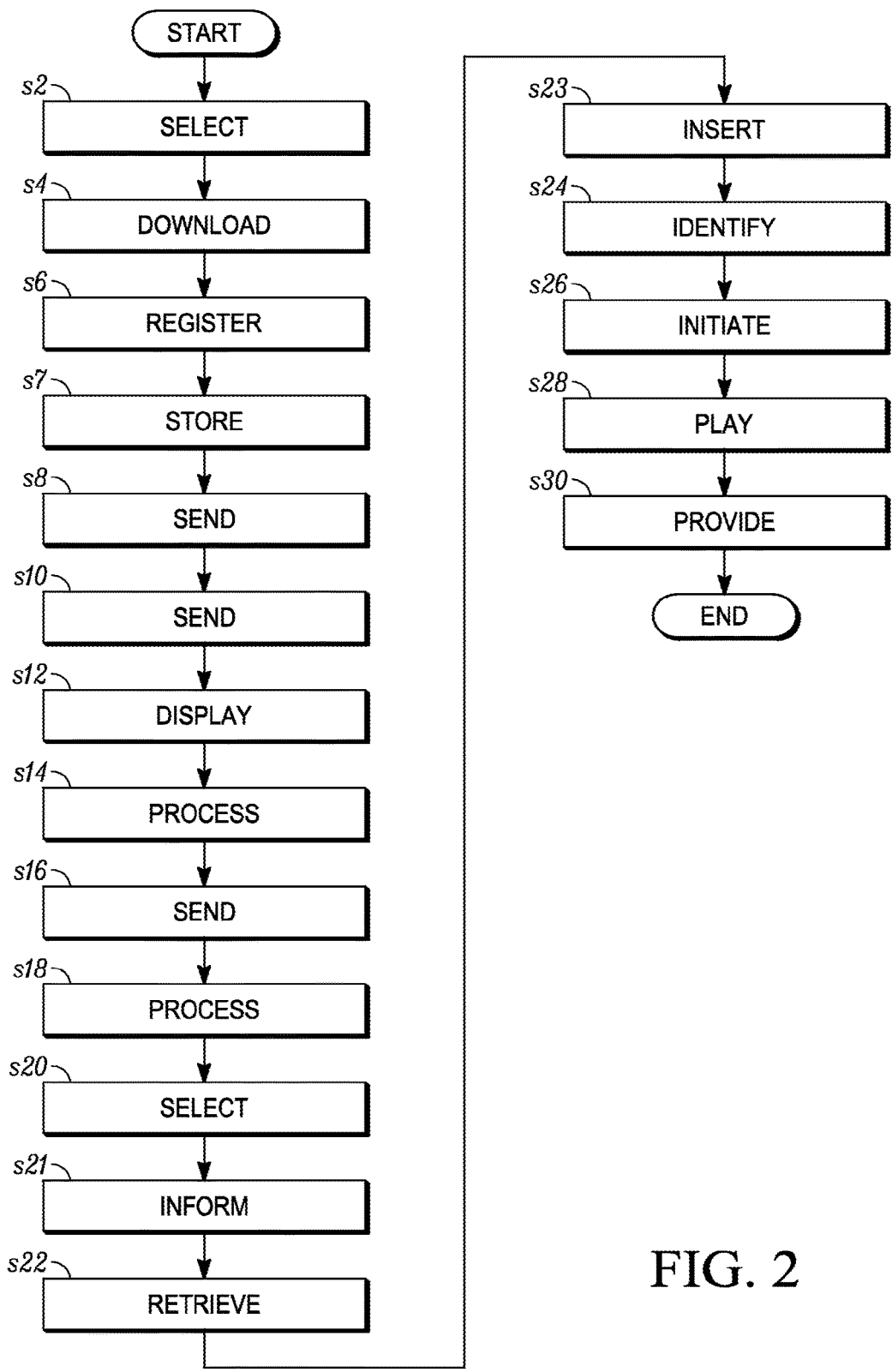
FIG. 2 is a process flow chart showing certain steps of an embodiment of a method of initiating an application on a user device.

FIG. 2 is a process flow chart showing certain steps of the process of performed by the entities in the network 1.

At step s2, the user 16 may select one or more of the games provided by the game providers 12. The user 16 may select the game or games he may wish to play at a future time.

For example, the game-services module 10 may compile a list of games provided by the game providers 12. This list of available games may then be provided by the game-services module 10 to the tablet computer 14 (e.g., via the Internet 8) for display, using the display 20 of the tablet computer 14, to the user 16. The user 16 may then select one or more of the displayed games. The selection of a game by the user 16 may comprise the user 16 purchasing the game or providing information (e.g., profile information or preference information) that may used, for example, by the game-services module 10.

At step s4, the games selected by the user 16 are downloaded by the tablet computer 14. The downloaded games may be stored by the game container 18.

At step s6, the tablet computer 14 may inform the game-services module 10 which of the games have been downloaded and stored in the game container 18. In other words, the tablet computer 14 may register with the game-services module 10 which games are stored in the game container 18 of the tablet computer 14. This may, for example, be performed by the game container 18 providing details of the stored games to the game-services module 10.

At step s7, the game-services module 10 may store, e.g., in the database 11, details of the games stored by the game container 18. This information may be stored alongside information by which the game container 18 may be identified. Thus, for a plurality of game containers 18 located on a plurality of different end-user devices, the game-services module 10 may store, in the database 11, details of which games are stored in which game containers 18.

At step s8, the content provider 2 provides multimedia content (e.g., TV programs, movies, radio, etc) to the set-top box 4. The multimedia content may be sent in any appropriate format, for example, the multimedia content may be encoded in an appropriate transport stream.

At step s10, the set-top box 4 may process the received multimedia content and send the processed information to the TV 6. The processing performed by the set-box 4 at step s10 may be any appropriate processing such that the processed multimedia content sent to the TV 6 is displayable by the TV 6. For example, the set-top box 4 may decode a transport stream received from the content provider 2 and send the decoded multimedia content to the TV 6.

At step s12, the TV 6 displays the multimedia content. Thus, the user 16 may view the multimedia content on the TV 6.

At step s14, the media-analysis module 5 may perform one or more media-analysis processes on the multimedia content that is received by it from the content provider 2 (or on metadata associated with that multimedia content). The media-analysis processes may be performed to identify what is being displayed to the user 16, i.e., what multimedia content is being consumed by the user 16. Alternatively, the media-analysis processes may be performed to determine an identifier for what is being displayed to the user 16 (i.e., information that may be used, e.g., by the game-services module 10, to identify what is being displayed to the user 16). For example, the media-analysis processes may be performed to identify the specific TV program or movie being watched by the user 16. Any appropriate media-analysis processes may be used. For example, the media-analysis module 5 may analyze programmatic metadata associated with the multimedia content to identify the multimedia content. Also for example, the media-analysis module 5 may analyze a closed-caption file or an audio file of the multimedia content to identify the multimedia content.

In other embodiments, the functionality provided by the media-analysis module 5 may be provided by one or more different modules, some or all of which may be located in a location different from that of the media-analysis module 5 of this embodiment. For example, analysis of the multimedia content may be performed by a module located in the TV 6. Alternatively, for example, the tablet computer 14 or other user device may comprise a module that is capable of discerning what the user 16 is watching on the TV 6 (e.g., by analyzing audio of the multimedia content or by detecting "watermarks" displayed on the TV 6).

At step s16, an output of the media-analysis module 5 (e.g., an identity of, or identifier for, the multimedia content) may be sent to the game-services module 10 (e.g., by the set-top box 4 via the Internet 8).

At step s18, the game-services module 10 may process the received output of the media-analysis module 5. The game-services module 10 may also process the information specifying which games have been downloaded and stored in the game container 18 (that may have been stored in the database 11 at step s7).

The processing performed by the game-services module 10 at step s18 may be performed to determine one or more games that may be suitable or appropriate for initiation. This processing may be performed as follows. Firstly, using the identity of, or identifier for, the multimedia content, one or more game types may be identified. This process of identifying game types may comprise utilizing information specified by the content provider 2 (e.g., the content provider 2 may specify that only certain types of games, e.g., puzzle games, may be initiated using his content). Also, the process of identifying game types may comprise utilizing information specified by the game providers 12 (e.g., the game providers 12 may specify that their games may only be initiated using certain types of multimedia content, e.g., multimedia content provided by certain content providers). Secondly, from those games that are stored in the game container 18 (i.e., that the tablet computer 14 has registered with the game-services module 10), the games that are of the identified types may be identified. Thus, at step s18, the game-services module 10 may identify, from the games stored on the game container 18, one or more games that may be initiated for the multimedia content that is being displayed (or has recently been displayed) to the user 16. In other embodiments, one or more games stored within the game container 18 may be identified in a different appropriate way.

At step s20, from the games identified at step s18, the game-services module 10 may select a game for initiation on the tablet computer 14. This selection of a game may be made in accordance with any appropriate criteria (for example criteria specified in a "game initiation policy").

Thus, by performing steps s18 and s20, the game-services module 10 may use information specifying what the user 16 is watching to select, from the games stored on the game container 18 of the tablet computer 14, a game for initiation on the tablet computer 14. In other embodiments, a different appropriate process may be performed by the game-services module 10 to select a game for initiation.

At step s21, information specifying which game has been selected may be sent from the game-services module 10 to the game container 18, i.e., the game container 18 may be informed which of the games stored by the game container 18 has been selected for initiation.

At step s22, the game-services module 10 may acquire any information or media content that is to be used by the selected game. For example, if the selected game comprises one or more elements or portions that may be dynamically filled using information or multimedia content, then the game-services module 10 may acquire that information or multimedia content. The acquired information or media content may relate to the specific multimedia content that is displayed to the user 16 at step s12. The information or media content may be acquired in any appropriate way, for example, the information or media content may be retrieved from any appropriate source, e.g., from the set-top box 4.

For example, if the selected game is a generic game comprising an element into which may be inserted media content or information that is related to the specific multimedia content being consumed by the user 16 (e.g., a screen-shot or other image taken from the displayed multimedia content or information extracted from the closed caption of the displayed multimedia content), then the game-services module 10 may retrieve that information.

The game-services module 10 may identify what information or multimedia content is to be acquired for the selected game. Alternatively, the game container 18 may specify to the game-services module 10 what information or multimedia content, or what type of information or multimedia content, is to be acquired for the selected game.

At step s23, any information retrieved (at step s22) by the game-services module 10 for inclusion in the game selected at step s20 may be included or inserted in that game. This step may be performed, for example, by the game-services module 10 sending the information or media content that was acquired at step s22 to the game container 18, and the game container 18 inserting or including the received information or media content into the selected game (which is stored in the game container 18). In other embodiments, this step of including the acquired information may be performed in a different way, e.g., by a different entity.

At step s24, if the selected game is a multi-player game, other users of client computing devices (e.g., tablet computers, smartphones, etc.) may be identified as potential additional players of the selected game. This may be performed using any appropriate process, e.g., a service-discovery process. For example, any other users who are also watching the same multimedia content as the user 16 and who have a device upon which the selected game has also been downloaded may be selected as potential additional players of the selected game. Also, the selection of potential additional game players may comprise analyzing user analytics, metadata relating to the multimedia content being consumed, etc. This may be performed, for example, to identify fans of the associated multimedia content or of the selected game. Also the selection of potential additional game players may comprise selecting, as a potential additional game player, one or more members of a social network of the user 16. Thus, at step s24 a community of potential game-players may be assembled.

At step s26, the selected game may be initiated on the tablet computer 14. The initiated game may include any multimedia content or information included in it at step s23.

In certain embodiments, the selected game may be initiated (i.e., launched or started) automatically by the game container 18. In other embodiments, the selected game may be initiated automatically in response to the tablet computer 14 receiving an "initiate game" instruction, e.g., from the game-services module 10. In other embodiments, the selected game may be initiated only after the user 16 has given his permission for that game to be initiated on the tablet computer 14. For example, a message asking whether the selected game should be initiated on the tablet computer 14 may be displayed, e.g., on the display 20 or on the TV 6, to the user 16. The user 16 may then allow the game to be initiated on the tablet computer 14.

The initiation (i.e., launching or triggering) of the game may be synchronized with a particular portion of the associated multimedia content. For example, a game associated with a TV program may be initiated when a particular event in the TV program occurs. Alternatively, the initiation of the game may be "skewed" relative to the associated content. For example, a game associated with a TV program may be initiated as soon as that TV program has ended or during a commercial break, etc.

If the selected game is a multi-player game, then the selected game may also be initiated on the client computing devices identified at step s24. Thus, a multiplayer game may be launched.

At step s28, the user 16 may play the initiated game on the tablet computer 14. The initiated game may comprise elements from the multimedia content that the user 16 is consuming, or has recently consumed, using the TV 6.

At step s30, information relating to the user's playing of the initiated game may be provided from the tablet computer 14 to the game-services module 10. This information may, for example, comprise information specifying whether or not the user 16 allowed the game to be initiated on the tablet computer 14, for how long the user 16 played the game, whether the user 16 completed the game, the specific multimedia the game was played in relation to, etc. This information may, for example, be stored by the game-services module 10, e.g., in the database 11. This information may, for example, be used by the game-services module 10 when selecting games for the user 16 at a future time. For example, the game-services module 10 may use the information received at step s30 to determine the user's favorite types of games (with respect to certain types of multimedia content) or what multimedia content the games that the user 16 played were related to. When, at a future time, the game-services module 10 selects games for the user 16 to play, the game-services module 10 may take into account what the user's favorite types of games are.

Thus, an embodiment of a method of initiating an application on a user device is provided.

The above described system and method advantageously tend to provide a "discovery" capability. In other words, it tends to be possible for the above system, using media-analysis processes, to discover what multimedia content (e.g., what TV program) a user is consuming or has recently consumed. This knowledge may then be used in a game-selection process. Also, this knowledge may be used to, in effect, customize a generic game for a certain user. Furthermore, this discovery process is advantageously separate and distinct from the process of game development.

The discovery capability further facilitates the assembly of a community of game players for multiplayer gameplay. For example, users who it is discovered are watching a particular TV show tend to be more likely to play a multiplayer game related to that TV show than users who are not watching, or have not watched, that TV show. This discovery capability tends to allow for the discovery of localized devices (e.g., on a local area network) as well as wide-area network (e.g., Internet-connected/cloud) based devices.

The above described system and method advantageously tend to provide a "pre-screening" or "filtering" capability. Such a capability advantageously tends to facilitate in the assembly of a community of game players for multiplayer gameplay. For example, users may be filtered depending upon their game-playing habits, personal preferences, profile information, and TV viewing habits. This may be performed to identify users that would most likely be interested in playing multiplayer games relating to certain multimedia content. Furthermore, the provided filtering capability tends to provide that such an assembly of a community of game players for multiplayer gameplay may be performed quickly (e.g., so that a multiplayer game may be initiated or launched whilst the multimedia content to which the game is related is being broadcast to, or consumed by, the users, or shortly thereafter). Furthermore, this filtering process is advantageously separate and distinct from the process of game development.

The above described system and method advantageously tend to provide "call-to-action" games to users (i.e., game that may urge a user to play them straight away). The games may be automatically initiated on a user's computing device, e.g., whilst the user is consuming multimedia content or shortly afterwards. Furthermore, the games provided by the above described system and method may advantageously be related to the multimedia content that the user is consuming or has recently consumed. Thus, the "brand" of the multimedia that the user is consuming or has recently consumed may be supported (i.e., strengthened) by the associated game.

Furthermore, the above described system and method tend to provide that games relating to multimedia content that the user is consuming, or has recently consumed, can be dynamically created. For example, the system may discern what the user is consuming and create or produce a game that is related to the specific multimedia that the user is consuming. This may be performed by either selecting a game that is directly related to what the user is consuming or by including in a generic game elements that relate to what the user is consuming.

The above described system and method may advantageously provide that the games provided to a user (e.g., by initiating that game on a computing device of that user) relate to multimedia content being consumed (or having been recently consumed) by that user. In particular, a game initiated on a secondary client device (e.g., a tablet computer) may relate to (e.g., may include information extracted from) multimedia content that is being consumed by a user on a primary device (e.g., a TV). Thus, content being viewed by a user may be utilized (e.g., in the form of image data or program metadata) to trigger call-to-action games that can reinforce or augment branding present on the primary video screen.

The above described method and apparatus advantageously tend to reduce costs associated with synchronizing games with multimedia content (e.g., TV programs) to which they relate. Also costs associated with assembling a community for multiplayer gameplay of those games tend to be reduced.

In the above embodiments, the application initiated on the tablet computer is a game. However, in other embodiments, a different type of application (e.g., a different type of computer program, etc.) may be initiated. For example, the application may be an advertisement that may, for example, comprise user-interactive elements. The different type of application may have included in it information extracted from the displayed multimedia content.

The application may be interstitial relative to the multimedia content to which it relates. In other words, the application may relate only to relatively small portions of the multimedia content as opposed to the multimedia content as whole. Also, the application may be a peer-to-peer application (or may comprise peer-to-peer elements). Also, the call-to-action element of the application may have a relatively short-duration so that any applications initiated for a user tend to relate to multimedia being consumed, or having been recently consumed, by that user.

In the above embodiments, the game-services module may optionally interact with a Digital Rights Management module (e.g., supplied by or controlled by a content studio or provider) to confirm possible licensing of certain specific segments of media content for use with call-to-action gaming.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method of launching or running an interactive software application, the method comprising:
    displaying, by a first device including one or more processors, multimedia content;
    determining, by a media-analysis module of the first device, what multimedia content is being presented by the first device;
    selecting, by a service module of the first device, an interactive application that is to be launched at a second client device while the determined multimedia content is being presented by the first device;
    acquiring information that is related to the multimedia content being presented by the first device and that indicates that presentation of the multimedia content has reached a specified portion of the multimedia content; and
    in response to acquiring the information indicating that presentation of the multimedia content has reached the specified portion, transmitting, by the service module of the first device and over a communications network, an instruction that automatically launches the selected interactive application on the second device based on the determined multimedia content being presented at the first device; and
    modifying, by the service module of the first device and based on the acquired information, the interactive application executing at the second device to incorporate content related to the determined multimedia content displayed by the first device into the interactive application while the determined multimedia content is being presented by the first device.

2. The method of claim 1, wherein the selected interactive application is an interactive game program that is executed using the second device.

3. The method of claim 1, comprising:
    determining, based on the acquired information, a time at which to transmit the instruction;
    wherein transmitting, by the service module of the first device and over the communications network, an instruction that automatically launches the selected interactive application on the second device comprises transmitting the instruction at the determined time.

4. The method of claim 3, wherein the acquired information indicates scheduled commercial times in the multimedia content.

5. The method of claim 1, wherein the interactive application is selected depending upon one or more of preferences or criteria specified by a user of the second device, interactions between a user of the second device and one or more software applications that have previously been launched or run on the second device, preferences or criteria specified by a provider of the multimedia content, or preferences or criteria specified by a provider of the software application.

6. The method of claim 1, comprising extracting the content related to the multimedia content from either the multimedia content displayed or metadata associated with the multimedia content displayed.

7. The method of claim 1, comprising providing, by the second device, information relating to an interaction with the launched interactive application.

8. The method of claim 1, comprising:
providing, by the second device and to the first device, information relating to an interaction with the launched interactive application; and
modifying, by the service module of the first device, the interactive application executing at the second device based on the provided information relating to the interaction.

9. The method of claim 1, wherein:
the selected interactive application is an interactive game that enables a plurality of players using respective devices to simultaneously play the interactive game;
the method comprising:
identifying each of the respective devices; and
launching, on each of the respective devices, the selected interactive application.

10. The method of claim 9, wherein a further device is selected from the respective devices depending upon one or more of preferences or criteria specified by a user of that further device, interactions between a user of that further device and one or more software applications that have previously been launched or run on that further device, preferences or criteria specified by a provider of the multimedia content, or preferences or criteria specified by a provider of the interactive application.

11. A system for launching or running an interactive application, the system comprising:
a first device including one or more processors configured to display multimedia content;
a media-analysis module executing on one or more processors of the first device, the media-analysis module configured to determine what multimedia content is being presented by the first device; and
a service module, executing on the one or more processors of the first device, configured to:
select an interactive application that is to be launched at a second client device while the determined multimedia content is being presented by the first device;
acquire information that is related to the multimedia content being presented by the first device and that indicates that presentation of the multimedia content has reached a specified portion of the multimedia content; and
in response to acquiring the information indicating that presentation of the multimedia content has reached the specified portion, transmit, over a communications network, an instruction that automatically launches the selected interactive application on the second device based on the determined multimedia content being presented at the first device; and
modify, based on the acquired information, the interactive application executing at the second device to incorporate content related to the determined multimedia content displayed by the first device into the interactive application while the determined multimedia content is being presented by the first device.

12. The system of claim 11, wherein the interaction application is selected depending upon one or more factors of preferences or criteria specified by a user of the second device, interactions between a user of the second device and one or more software applications that have previously been launched or run on the second device, preferences or criteria specified by a provider of the multimedia content, or preferences or criteria specified by a provider of the software application.

13. The system of claim 11, wherein what multimedia content is being presented by the first device is determined depending upon one or more factors selected from the group comprising:
programmatic metadata, a closed-captioned file, and an audio file associated with the multimedia content.

14. The system of claim 13, the media-analysis module configured to extract the programmatic data associated with the determined multimedia content from the determined multimedia content.

15. The system of claim 11, the service module of the first device configured to:
determine, based on the acquired information, a time at which to transmit the instruction;
wherein transmitting, over the communications network, an instruction that automatically launches the selected interactive application on the second device comprises transmitting the instruction at the determined time.

16. The system of claim 15, wherein the acquired information indicates scheduled commercial times in the multimedia content.

17. The system of claim 11, the service module of the first device configured to:
extracting the content related to the multimedia content from either the multimedia content displayed or metadata associated with the multimedia content displayed.

18. The system of claim 11, wherein the second device is configured to provide information relating to an interaction with the launched interactive application.

19. The system of claim 11, comprising:
a plurality of respective devices;
wherein the selected interactive application is an interactive game that enables a plurality of players using respective devices to simultaneously play the interactive game; and
wherein the service module of the first device is configured to:
identify each of the respective devices; and
launch, on each of the respective devices, the selected interactive application.

20. The system of claim 19, wherein a further device is selected from the respective devices depending upon one or more of preferences or criteria specified by a user of that further device, interactions between a user of that further device and one or more software applications that have previously been launched or run on that further device, preferences or criteria specified by a provider of the multimedia content, or preferences or criteria specified by a provider of the interactive application.

* * * * *